(12) United States Patent
Henry et al.

(10) Patent No.: US 11,375,439 B2
(45) Date of Patent: Jun. 28, 2022

(54) PRIORITIZING FINE TIMING MEASUREMENT REQUESTS

(71) Applicant: Cisco Technology, Inc., San Jose, CA (US)

(72) Inventors: Jerome Henry, Pittsboro, NC (US); Akram I. Sheriff, San Jose, CA (US); Sudhir K. Jain, Fremont, CA (US); Pooya Monajemi, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 23 days.

(21) Appl. No.: 16/902,038

(22) Filed: Jun. 15, 2020

(65) Prior Publication Data

US 2021/0392568 A1 Dec. 16, 2021

(51) Int. Cl.
| | |
|---|---|
| *H04B 7/0413* | (2017.01) |
| *H04B 7/06* | (2006.01) |
| *H04B 17/24* | (2015.01) |
| *H04B 17/27* | (2015.01) |
| *H04W 24/08* | (2009.01) |
| *H04W 24/10* | (2009.01) |
| *H04W 48/04* | (2009.01) |
| *H04W 48/06* | (2009.01) |

(Continued)

(52) U.S. Cl.
CPC .......... *H04W 48/16* (2013.01); *H04B 7/0413* (2013.01); *H04B 7/0689* (2013.01); *H04B 17/24* (2015.01); *H04B 17/27* (2015.01); *H04W 24/08* (2013.01); *H04W 24/10* (2013.01); *H04W 48/04* (2013.01); *H04W 48/06* (2013.01); *H04W 64/003* (2013.01); *H04W 64/006* (2013.01); *H04W 72/1242* (2013.01); *H04W 72/1278* (2013.01); *H04W 84/12* (2013.01); *H04W 88/08* (2013.01); *H04W 92/10* (2013.01)

(58) Field of Classification Search
CPC .. H04B 7/02–12; H04B 17/0082–3913; H04L 5/003–0098; H04L 7/0004–10; H04L 43/02–50; H04W 8/22–245; H04W 24/02–10; H04W 28/02–26; H04W 48/02–20; H04W 56/0005–0095; H04W 60/005–06; H04W 64/003–006; H04W 72/005–14; H04W 74/002–0891; H04W 84/005–22; H04W 88/005–188; H04W 98/02–24

See application file for complete search history.

(56) References Cited

U.S. PATENT DOCUMENTS

2014/0335885 A1* 11/2014 Steiner .................. H04W 64/00
2014/0355461 A1* 12/2014 Aldana ................. H04W 64/00

(Continued)

OTHER PUBLICATIONS

IEEE Computer Society, "Part 11: Wireless LAN Medium Access Control (MAC) and Physical Layer (PHY) Specifications," IEEE Std 802.11. 2016.

(Continued)

*Primary Examiner* — Timothy J Weidner

(74) *Attorney, Agent, or Firm* — Patterson + Sheridan, LLP

(57) ABSTRACT

Aspects described herein include a method comprising receiving an initial Fine Timing Measurement (FTM) request from an Initiating Station (ISTA), determining a priority classification of the ISTA relative to other ISTAs, and determining, based at least partly on the priority classification, whether to accept the initial FTM request.

17 Claims, 3 Drawing Sheets

(51) Int. Cl.
  *H04W 48/16*  (2009.01)
  *H04W 64/00*  (2009.01)
  *H04W 72/12*  (2009.01)
  *H04W 84/12*  (2009.01)
  *H04W 88/08*  (2009.01)
  *H04W 92/10*  (2009.01)

(56) References Cited

U.S. PATENT DOCUMENTS

| | | |
|---|---|---|
| 2018/0139077 A1 | 5/2018 | Amizur et al. |
| 2020/0015038 A1* | 1/2020 | Burugupalli .......... H04W 4/023 |
| 2020/0084706 A1* | 3/2020 | Yong .................. H04W 64/003 |

OTHER PUBLICATIONS

Jerome Henry and Nicolas Montavont, "Fingerprinting using Timing Measurement," MobiWac '19, Nov. 25-29, 2019.

QualComm Incorporated, "Low Power Periodic and Triggered Location for the LMF Based Solution", 3rd Generation Partnership Project (3GPP), dated Apr. 18, 2018, pp. 1-12.

Nokia, "Email Discussion of RANAP CR Release 4 additions in Iu to support new positioning methods", 3rd Generation Partnership Project (3GPP), dated Sep. 3, 2001, pp. 1-6.

PCT Notification of Transmittal of The International Search Report and The Written Opinion of The International Searching Authority, or The Declaration for Application PCT/US2021/070707, dated Sep. 15, 2021.

* cited by examiner

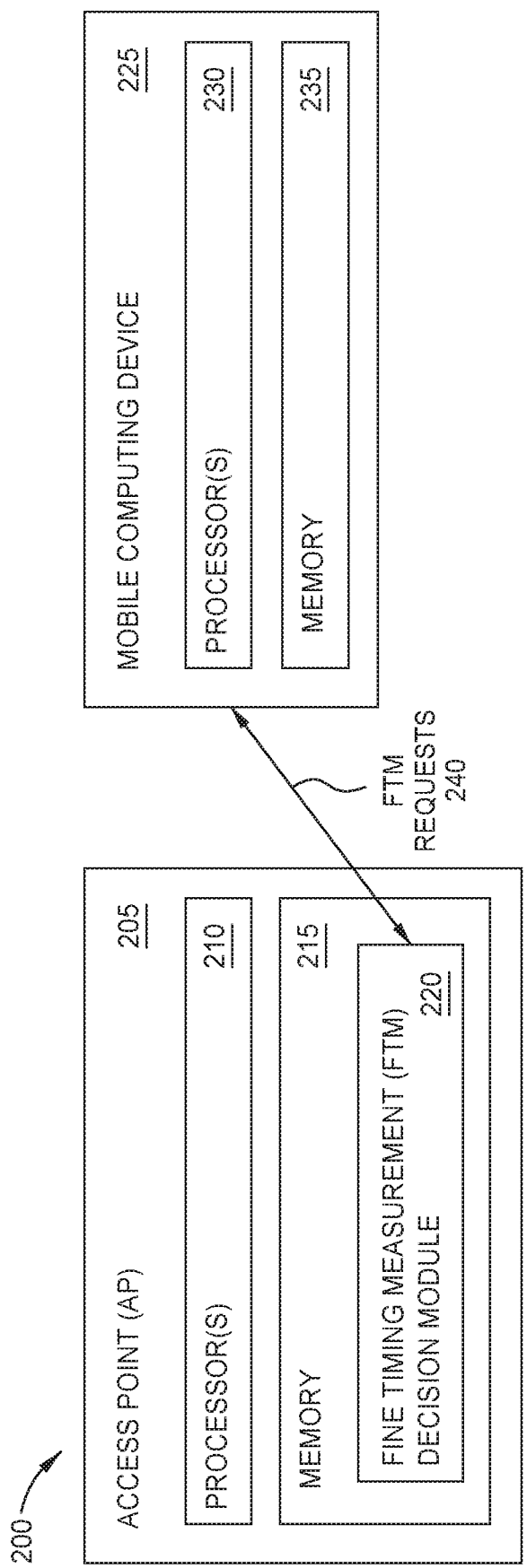
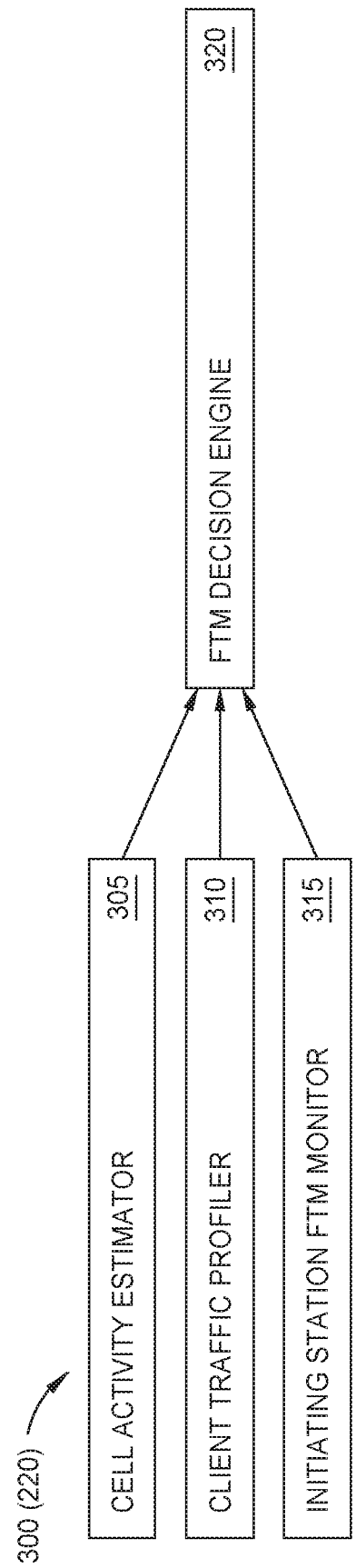
FIG. 2
FIG. 3

PRIORITIZING FINE TIMING MEASUREMENT REQUESTS

TECHNICAL FIELD

Embodiments presented in this disclosure generally relate to wireless network devices, and more specifically, to addressing ranging requests from wireless devices.

BACKGROUND

The IEEE 802.11 standard has recently incorporated Fine Timing Measurement (FTM) techniques allowing an Initiating Station (ISTA) to obtain its relative or absolute position through ranging exchanges. FTM permits the ISTA to be uniquely identified, even in cases where the ISTA is unassociated with a Responding Station (RSTA) and/or where the ISTA changes its MAC address. The FTM process is largely controlled by the requesting ISTAs and not by the Receiving Station (RSTA).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 2 illustrates an exemplary system including an access point (AP) having a FTM decision module, according to one or more embodiments.

FIG. 3 illustrates an exemplary arrangement of a FTM decision module, according to one or more embodiments.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
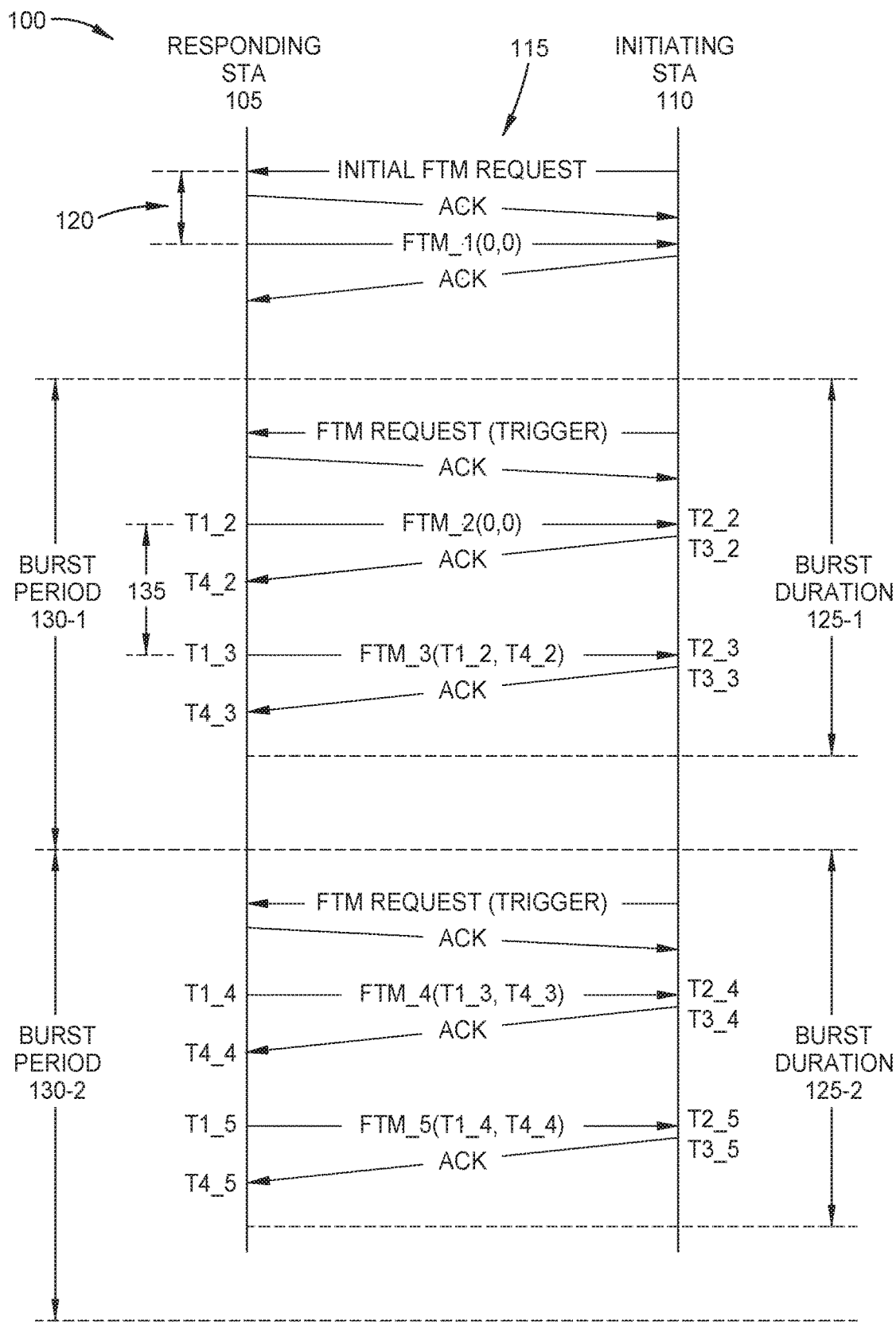
FIG. 1 is a diagram illustrating an exemplary FTM exchange, according to one or more embodiments.

One embodiment presented in this disclosure is a method comprising receiving an initial Fine Timing Measurement (FTM) request from an Initiating Station (ISTA), determining a priority classification of the ISTA relative to other ISTAs, and determining, based at least partly on the priority classification, whether to accept the initial FTM request.

Another embodiment presented in this disclosure is an access point (AP) comprising one or more computer processors configured to receive an initial Fine Timing Measurement (FTM) request from an Initiating Station (ISTA), determine a priority classification of the ISTA relative to other ISTAs, and determine, based at least partly on the priority classification, whether to accept the initial FTM request.

Another embodiment presented in this disclosure is a computer program product comprising a computer-readable storage medium having computer-readable program code embodied therewith. The computer-readable program code is executable by one or more computer processors to perform an operation comprising receiving an initial Fine Timing Measurement (FTM) request from an Initiating Station (ISTA), determining a priority classification of the ISTA relative to other ISTAs, and determining, based at least partly on the priority classification, whether to accept the initial FTM request.

Example Embodiments

To perform FTM, an ISTA and a RSTA exchange bursts of frames in order to compute a relative distance (ranging). The RSTA may typically be a static computing device such as an AP, and the ISTA is typically not an AP (e.g., a mobile computing device). Each ISTA may initiate the FTM process by transmitting an initial FTM request to the RSTA. The RSTA has discretion to decline the initial FTM requests received from ISTAs, and may decline by sending a decline response to the ISTA or by ignoring the initial FTM request (that is, permitting an elapse of time without responding to the ISTA). When accepting an initial FTM request, the RSTA may accept FTM exchange parameters included in the initial FTM request, or may negotiate with the ISTA for different FTM exchange parameters.

The FTM process is driven primarily by requesting ISTAs and not by the RSTA. Thus, the cumulative effect of multiple individual FTM exchanges with a single RSTA can degrade the efficiency of the cell.

According to embodiments herein, an AP (or other RSTA) comprises one or more computer processors configured to receive an initial FTM request from an ISTA, determine a priority classification of the ISTA relative to other ISTAs, and determine, based at least partly on the priority classification, whether to accept the initial FTM request. In some embodiments, the AP includes a cell activity estimator that estimates an activity of the channel, a client traffic profiler that determines a priority classification of the ISTA(s) using a plurality of factors, and an ISTA FTM monitor that monitors FTM exchanges of the ISTA during a predefined period. The AP further includes a decision engine that receives outputs from the cell activity estimator, the client traffic profiler, and the ISTA FTM monitor, and that generates a FTM response preference score for the ISTA. In some embodiments, determining whether to accept the initial FTM request is based on the FTM response preference score. In some cases, the AP may limit, based on the FTM response preference score, a number of exchanges with the ISTA responsive to the initial FTM request.

In this way, the AP may have improved management of the FTM requests received from various ISTAs. For example, the AP may limit the collective amount of airtime allocated to FTM traffic, and/or may dynamically provide priority for FTM exchanges based on different factors of the ISTAs.

FIG. 1 is a diagram 100 illustrating an exemplary FTM exchange, according to one or more embodiments. Although discussed primarily using the terminology of the IEEE 802.11 standard, the techniques described herein are applicable to addressing ranging requests using other suitable protocols.

When an ISTA 110 seeks to determine its own location, the ISTA 110 may discover one or more RSTAs to provide ranging support using, e.g., standard 802.11 scanning procedures. Each of the one or more RSTAs may have known locations. In some embodiments, the one or more RSTAs are APs and the ISTA 110 is a mobile computing device, although other types of computing devices are also contemplated. In some embodiments, the one or more RSTAs may advertise support for the RSTA functionality using the Extended Capabilities Information Element in beacon frames and/or probe response frames.

In the diagram 100, the ISTA 110 selects an RSTA 105 and initiates the FTM exchange by transmitting a frame comprising an initial FTM request 115 to the RSTA 105. The initial FTM request 115 may indicate the FTM exchange parameters being proposed by the ISTA 110.

The RSTA 105 acknowledges the initial FTM request 115 using standard 802.11 acknowledge (ACK) procedure. When the initial FTM request 115 is accepted by the RSTA 105, e.g., according to the techniques described herein, the RSTA 105 responds with an initial FTM frame FTM_1 within 10 milliseconds (ms) of receiving the initial FTM request 115. The initial FTM frame FTM_1 includes the FTM exchange parameters approved by the RSTA 105. In some cases, the FTM exchange parameters proposed by the ISTA 110 may be accepted by the RSTA 105 without change. In some embodiments, the RSTA 105 may change one or more of the FTM exchange parameters to limit a number of exchanges with the ISTA 110 responsive to the initial FTM request 115. The ISTA 110 acknowledges the initial FTM frame FTM_1.

The FTM exchange parameters approved by the RSTA 105 define a timing of subsequent FTM exchanges between the RSTA 105 and the ISTA 110, and more specifically defines one or more burst periods 130-1, 130-2, during which the RSTA 105 and the ISTA 110 exchange one or more FTM frames. At the beginning of each burst period 130-1, 130-2, the ISTA 110 transmits a respective FTM Request (Trigger) frame, which indicates the availability of the ISTA 110 to perform ranging at that time.

In a burst duration 125-1 of the burst period 130-1, the RSTA 105 transmits a FTM frame FTM_2 and records a time t1_2 at which the FTM frame FTM_2 was sent (e.g., a time of departure or ToD). The ISTA 110 receives the FTM frame FTM_2 and records a time of arrival (ToA) t2_2. The ISTA 110 acknowledges the FTM frame FTM_2 and records a ToD t3_2 of the ACK frame. The RSTA 105 records a ToA t4_2 of the ACK frame.

The RSTA 105 transmits a FTM frame FTM_3 that includes the times t1_2, t4_2. In some embodiments, the RSTA 105 controls a ToD t1_3 of the FTM_3 according to a Min Delta FTM 135 specified by the FTM exchange parameters. The ISTA 110 may compute a distance d (in meters) between the ISTA 110 and the RSTA 105 according to the following:

$$d = \frac{(t4\_2 - t1\_2) - (t3\_2 - t2\_2)}{2} \times c$$

where the times t1_2, t2_2, t3_2, t4_2 are expressed in milliseconds, the quantity (t4_2−t1_2)−(t3_2−t2_2) represents a roundtrip time (RTT), and c represents the speed of light.

In a burst duration 125-2 of the burst period 130-2, the RSTA 105 transmits a FTM frame FTM_4 and records a ToD t1_4 at which the FTM frame FTM_4 was sent. The FTM frame FTM_4 includes times t1_3, t4_3. The ISTA 110 receives the FTM frame FTM_4 and records a ToA t2_4. The ISTA 110 acknowledges the FTM frame FTM_4 and records a ToD t3_4 of the ACK frame. The RSTA 105 records a ToA t4_4 of the ACK frame. The RSTA 105 transmits a FTM frame FTM_5 that includes the times t1_4, t4_4. The ISTA 110 may again compute the distance d (in meters) using the times t1_4, t2_4, t3_4, t4_4.

FIG. 2 illustrates an exemplary system 200 including an access point (AP) 205 having a FTM decision module 220, according to one or more embodiments. The features of the system 200 may be used in conjunction with other embodiments. For example, the AP 205 may be used in performing the FTM exchange of FIG. 1.

The AP 205 comprises one or more processors 210 and a memory 215. The one or more processors 210 may be implemented in any suitable form, such as a general purpose microprocessor, a controller, an application-specific integrated circuit (ASIC), and so forth. The memory 215 may include a variety of computer-readable media selected for their size, relative performance, or other capabilities: volatile and/or non-volatile media, removable and/or non-removable media, etc.

A mobile computing device 225 is communicatively coupled with the AP 205 via a wireless network, such as a local area network (LAN), a wide area network (WAN), or a public (e.g., the Internet). The mobile computing device 225 may be implemented in any suitable form, such as a smartphone, a tablet computer, a laptop computer, a wearable computer, and so forth. The mobile computing device 225 comprises one or more processors 230 and a memory 235. The one or more processors 230 may be configured similarly to the one or more processors 210, and the memory 235 may be configured similarly to the memory 215.

The memory 215 may include one or more modules for performing various functions described herein. In one embodiment, each module includes program code that is executable by the one or more processors 210. However, other embodiments of the system 200 may include modules that are partially or fully implemented in other hardware (i.e., circuitry) or firmware of the AP 205.

As shown, the memory 215 comprises a FTM decision module 220 that determines whether to accept initial FTM requests included in FTM requests 240 received from the mobile computing device 225. In some embodiments, the FTM decision module 220 receives an initial FTM request from an ISTA (here, the mobile computing device 225), determines a priority classification of the ISTA relative to other ISTAs, and determines, based at least partly on the priority classification, whether to accept the initial FTM request. The FTM decision module 220 may set one or more FTM exchange parameters, e.g., limiting a number of exchanges with the ISTA responsive to the initial FTM request.

FIG. 3 illustrates an exemplary arrangement 300 of the FTM decision module 220, according to one or more embodiments. In the arrangement 300, the FTM decision module 220 comprises a cell activity estimator 305, a client traffic profiler 310, and an ISTA FTM monitor 315.

The cell activity estimator 305 estimates a channel activity using any suitable techniques. The cell activity estimator 305 may calculate a channel utilization. In some embodiments, the cell activity estimator 305 directly outputs values of the estimated channel activity (e.g., channel utilization values). In other embodiments, the cell activity estimator 305 generates a score based on the estimated channel activity, e.g., a traffic density value. In some embodiments, the FTM decision module 220 is more likely to decline an initial FTM request for larger values of the channel activity. For example, a greater traffic density value tends to leave less space for approving initial FTM requests. Thus, for greater traffic density values, an initial FTM request is less likely to be accepted unless the initial FTM request is otherwise prioritized, e.g., from an emergency response team, as discussed further below.

In some embodiments, the client traffic profiler 310 monitors traffic from individual ISTAs, e.g., a traffic type and/or a traffic volume. The client traffic profile 310 may further receive position information from the ISTAs (e.g., Location-Based Service and/or a RSSI monitor) and FTM option support. In some embodiments, the traffic type includes classifying the traffic as FTM or non-FTM, and/or classifying the non-FTM traffic as voice, data, and so forth.

Conventional FTM techniques permit any ISTA to trigger any number of FTM exchanges with any RSTA in range, whether the ISTA is associated with the RSTA or not. Without regulation, this approach may be widely disruptive to cell efficiency of the RSTA. In some embodiments, the client traffic profiler 310 determines a priority classification of the ISTA relative to other ISTAs, such that different groups of ISTAs may be defined with which FTM exchanges are of lesser or of greater importance.

The priority classification of the ISTA may be represented in any form. In some embodiments, determining a priority classification of the ISTA comprises generating a FTM response sensitivity score for the ISTA using a plurality of factors. The priority classification is based on the FTM response sensitivity score relative to FTM response sensitivity score of the other ISTAs.

In some embodiments, the plurality of factors includes a factor for whether the ISTA is associated with the RSTA. Generally, non-associated ISTAs tend to have a lesser score than associated ISTAs.

In some embodiments, the plurality of factors includes a factor for a ranging measurement mode of the ISTA. Generally, ISTAs in HEz (high efficiency ranging) mode tend to have a greater score than ISTAs in VHTz (very high throughput ranging) mode, as the AP triggers each ranging measurement in the HEz mode. In this way, the HEz mode may be preferable as it enables the AP to manage spectrum usage.

In some embodiments, the plurality of factors includes a factor for a ranging priority parameter of the ISTA. Generally, ISTAs having a greater self-announced location priority level (e.g., defined as part of the 802.11az standard) tend to have a greater score than ISTAs with a lesser location priority level.

In some embodiments, the plurality of factors includes a factor for whether the ISTA is sharing its location (Location Measurement Results, or LMR, that is shared upon completion of the FTM burst). Generally, ISTAs that share their location tend to have a greater score than ISTAs that do not.

In some embodiments, the plurality of factors includes a factor for an authentication group type of the ISTA. For example, guests tend to have a lesser score, while emergency response teams tend to have a higher score. Further, the classification of the authentication group types may be provided by an external tool, e.g., a hierarchy based on the user identity and/or type.

In some embodiments, the plurality of factors includes a factor for a level of traffic of the ISTA. Generally, those ISTAs that are associated but idle (or low traffic) tend to have a greater score than ISTAs with high traffic.

In some embodiments, the plurality of factors includes a factor for a type of the traffic of the ISTA. Generally, those ISTAs running real-time traffic, such as voice, tend to have greater scores than ISTAs running non-real time traffic, as the real-time ISTAs have a greater need to determine location to decide whether to transition from Wi-Fi to LTE or to other Wi-Fi. Further, estimators may be used to update the score. For example, a real-time ISTA (e.g., running a voice call) for which a mean opinion score (MoS) degrades over an interval may have an increased score, as the location of the ISTA needs to be determined quickly to facilitate roaming to a more suitable AP.

In some embodiments, the plurality of factors includes a factor for a rate of movement of the ISTA. Generally, ISTAs that are moving more quickly (e.g., identified by a greater change to RSSI over an interval) tend to have a greater score than ISTAs that are idle or moving more slowly.

The FTM response sensitivity score may be generated using any combination of the factors discussed above, and may be generated using any suitable mathematical and/or logical functions. In one embodiment, the different factors may be weighted and the FTM response sensitivity score is generated as a sum of the different weighted terms. In another embodiment, the FTM response sensitivity score is determined as greater than a threshold value for approving the initial FTM request when the ISTA is sharing its location.

The ISTA FTM monitor 315 monitors FTM exchanges of the ISTA during a predefined period. In some embodiments, the length of the predefined period may be manually and/or dynamically configurable.

In some embodiments, the ISTA FTM monitor 315 determines a number of initial FTM requests, the number of FTM exchanges in each FTM burst period, and the length of FTM exchanges in each FTM burst period. For example, an ISTA operating in the VHTz mode begins an FTM exchange by transmitting an initial FTM request, indicating an availability window (i.e., a target time window during which FTM exchanges will be conducted during the next FTM burst period). The ISTA can initiate such an FTM exchange with more than one RSTA.

The ISTA may propose a number and/or length of FTM burst periods, and the RSTA can override the proposed values by providing a different burst count and duration. Then, during each FTM burst window, the ISTA will transmit a number of FTM frames and each frame (with its response from the RSTA) provides one ranging sample. Generally, a longer FTM burst window tends to be more disruptive to AP activity, as the AP is unable to scan another channel with RRM, even where there is no traffic in the cell. Similarly, a longer FTM burst window count also tends to be more disruptive.

In some cases, the ISTA may open a window to the RSTA (e.g., an AP), complete the FTM burst, and repeat the operation using another AP or channel. In other cases, the ISTA may open multiple windows to multiple APs, and perform the FTM exchanges based on its own traffic pattern. In some embodiments, the ISTA FTM monitor 315 associates a disruption score with each ISTA based on the recorded FTM activity over an interval. Here, ISTAs having shorter windows tend to receive a higher score, as ISTA FTM traffic tends to be less disruptive to AP activity when the window is short. Further, ISTAs having single windows tend to have a higher score than ISTAs that open simultaneous windows to more than one AP.

Each burst uses a certain number of FTM exchanges that is determined by the ISTA. ISTAs that use fewer FTM exchanges to complete one ranging evaluation tend to have a higher score than ISTAs that use more exchanges. Additionally, each ISTA determines, within a FTM burst, when the next FTM frame is going to be sent. Those ISTAs that use FTM bursts sent at intervals matching the priority value tend to receive a higher score. Generally, the interval should match the range expected for the associated traffic. Thus, ISTAs that send the next FTM frame after a short AIFS (e.g., estimated at 4 slot times) will receive a lesser score than ISTAs that send the next FTM frame at an interval compatible with its traffic priority (e.g., estimated at 15 slot times). In other words, ISTAs that treat their FTM traffic with a different priority from their data traffic receive a different score (often a lesser score) than ISTAs that treat FTM traffic at the same level as other traffic.

The FTM decision module 220 further comprises a FTM decision engine 320 that receives outputs from the cell activity estimator 305, the client traffic profiler 310, and the ISTA FTM monitor 315. In some embodiments, the FTM decision engine 320 generates a FTM response preference score for the ISTA. The FTM response preference score may be generated using any combination of the outputs from the cell activity estimator 305, the client traffic profiler 310, and the ISTA FTM monitor 315, and may be generated using any suitable mathematical and/or logical functions.

The FTM decision engine 320 determines, based on the FTM response preference score for the ISTA, whether to accept the initial FTM request from the ISTA. In some embodiments, the initial FTM request will be accepted by the FTM decision engine 320 when the FTM response preference score meets a threshold value. In some embodiments, the threshold value may be determined based on historical scores, e.g., determined to cause a certain percentage of initial FTM requests to be accepted. In one embodiment, the different outputs may be weighted and the FTM response preference score is generated as a sum of the different weighted terms.

In some embodiments, as the channel utilization increases, the FTM response preference score decreases faster for ISTAs having lesser FTM response sensitivity scores. In some embodiments, and as discussed above, ISTAs that share their location may tend to have greater FTM response sensitivity scores. In other embodiments, however, ISTAs that advertise that they will not share their location may have greater FTM response sensitivity scores in environments where privacy is prioritized.

In some embodiments, when Location-Based Service systems compute the location of the ISTA, and when the ISTA shares its location results (LMR), a larger difference between the computed location (e.g., with RSSI/AoA-based location computation) and the LMR returned by the ISTA may correspond to an increased FTM response preference score. This is because additional FTM frames increase the LMR count and also the frame count from the ISTA, which can be used to refine the RSSI/AoA-based location). The FTM decision engine 320 controls the radio of the AP to selectively stop responding sooner to VHTz mode requests from ISTAs having lesser FTM response preference scores than ISTAs with higher FTM response preference scores. Additionally, in HEz mode the ISTAs with lesser FTM response preference scores may receive fewer triggers.

Because the ISTA FTM monitor 315 operates over an interval, one effect is that FTM response preference scores for ISTAs tend to increase when the ISTAs are controlled by the FTM decision engine 320 to not exchange ranging frames with the AP. In this way, ISTAs with lesser FTM response preference scores are not entirely prevented from FTM exchanges.

As discussed above, the FTM decision engine 320 determines whether to accept or decline an initial FTM request based on the FTM response preference score. In some embodiments, the FTM decision engine 320 limits, based on the FTM response preference score, a number of exchanges with the ISTA responsive to the initial FTM request. For example, the FTM decision engine 320 may specify a number of FTM exchanges per burst period, a minimum time between FTM exchanges (Min Delta FTM), and/or a number of FTM bursts.

In this way, the FTM decision engine 320 may instruct the AP to respond more slowly to a particular ISTA's FTM frames (while remaining within the 10 ms max target defined by FTM), thus allowing fewer FTM exchanges per FTM burst. Additionally or alternatively, the FTM decision engine 320 may instruct the AP to respond to only a certain number (n) of FTM frames per FTM burst for a particular ISTA. Additionally or alternatively, the FTM decision engine 320 may instruct the AP to respond to only a certain number (m) of initial FTM requests per interval for a particular ISTA. Thus, the FTM decision engine 320 may control the AP response per ISTA based on the number of FTM bursts allowed per interval, the number of FTM exchanges per FTM burst, and/or the rate of the FTM exchanges within each FTM burst.

In some embodiments, when the channel activity is high and/or the FTM response preference scores are low, the AP may be instructed by the FTM decision engine 320 to respond to (or trigger) only those ISTAs that will share their location information. In this case, the AP can indicate in its unicast or broadcast messages (e.g. beacons) whether it would accept initial FTM requests from non-sharing ISTAs, or whether it would require ISTAs to share their location information. In some embodiments, the messaging from the AP may be performed selectively (e.g., mandating sharing from only some ISTAs, or only allowing some ISTAs not to share), even where the ISTA indicates that it is ready to (or capable of) share the location information.

In some embodiments, the initial FTM requests may indicate whether the ISTA corresponds to emergency services (e.g., e911 calls) or other prioritized categories. In such a case, the initial FTM requests of the prioritized categories may take precedence over the routine operation of the FTM decision engine 320.

In some embodiments, the functional elements of the AP (e.g., included in the FTM decision module 220) may be manually configured or may be automated. For example, the cell activity estimator 305 may include a linear regression engine that may learn cell utilization levels where client experience is degraded, and may dynamically learn and set the optimal thresholds.

Further, the FTM decision module 220 may include a configurable parameter that defines a priority between air time allocated to ranging and air time allocated to data frames. In some embodiments, a deployment technician may set the parameter. In some embodiments, the parameter controls a percentage of air time, over a moving average window, that is allocated to FTM ranging. Once FTM requests exceed the percentage, the other functionality of the FTM decision module 220 operates to limit the acceptance of the initial FTM requests, as discussed above.

In some embodiments, the FTM ranging frames are associated to the equivalent of an 802.11 access category. The parameter represents a constraint factor that limits the volume of airtime consumed by FTM traffic, while providing differential priority for FTM exchanges based on the ISTA type, location, movement, user, traffic classification, and so forth. Thus, the FTM exchanges may be included in the comprehensive airtime allocation strategy, instead of being statically allowed or blocked globally.

Figure 4:
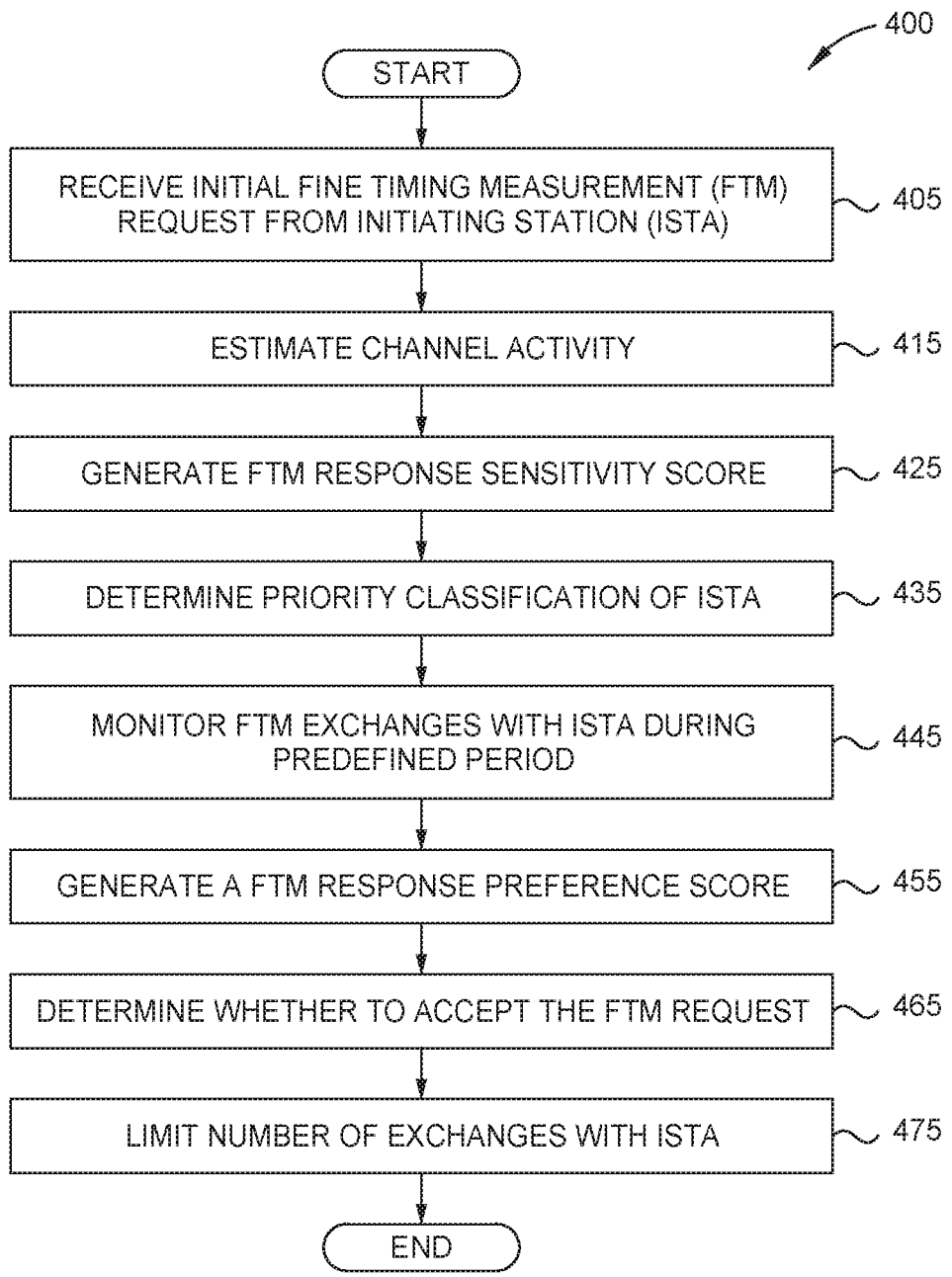
FIG. 4 illustrates an exemplary method of addressing a FTM request, according to one or more embodiments.

FIG. 4 illustrates an exemplary method 400 of addressing a FTM request, according to one or more embodiments. The method 400 may be used in conjunction with other embodiments described herein. For example, the method 400 may be performed by the AP 205 of FIG. 2, when operating as a RSTA.

The method 400 begins at block 405, where an initial FTM request from an ISTA is received by the AP. At block 415, the AP estimates a channel activity. At block 425, the AP generates a FTM response sensitivity score, e.g. using a plurality of factors. At block 435, the AP determines a priority classification of the ISTA, e.g., based on the FTM response sensitivity score. At block 445, the AP monitors FTM exchanges with ISTA during a predefined period. In some embodiments, blocks 415, 425, 435, 445 are performed responsive to receiving the initial FTM request. In other embodiments, one or more of the blocks 415, 425, 435, 445 are performed prior to receiving the initial FTM request.

At block 455, the AP generates a FTM response preference score. In some embodiments, the FTM response preference score is generated based on the channel activity, the priority classification of the ISTA, and the monitored FTM exchanges. At block 465, the AP determines whether to accept the FTM request, e.g., based on the FTM response preference score. At block 475, the AP limits the number of exchanges with the ISTA, e.g., using the FTM response preference score. The method 400 ends following completion of block 475.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
receiving, at a Responding Station (RSTA) over a channel, an initial Fine Timing Measurement (FTM) request from an Initiating Station (ISTA);
determining, based on the FTM request, whether the ISTA will share location results of the FTM request with the RSTA;
calculating a utilization of the channel;
determining a priority classification of the ISTA relative to other ISTAs based at least in part on whether the ISTA will share the location results of the FTM request with the RSTA and the utilization of the channel; and
determining, based at least partly on the priority classification, whether to accept the initial FTM request.

2. The method of claim 1, wherein determining the priority classification of the ISTA comprises:
generating a FTM response sensitivity score for the ISTA using a plurality of factors,
wherein the priority classification is based on the FTM response sensitivity score relative to FTM response sensitivity score of the other ISTAs.

3. The method of claim 2, wherein the plurality of factors include whether the ISTA will share the location results of the FTM request with the RSTA, the utilization of the channel, and one or more factors selected from the following:
whether the ISTA is associated with the RSTA;
a ranging measurement mode of the ISTA;
a ranging priority parameter of the ISTA;
an authentication group type of the ISTA;
a level of traffic of the ISTA;
a type of the traffic of the ISTA; and
a rate of movement of the ISTA.

4. The method of claim 1, further comprising:
monitoring FTM exchanges of the ISTA during a predefined period, wherein determining whether to accept the initial FTM request is further based on the monitored FTM exchanges.

5. The method of claim 4, further comprising:
generating a FTM response preference score for the ISTA using the channel utilization, the monitored FTM exchanges, and the priority classification,
wherein determining whether to accept the initial FTM request is based on the FTM response preference score.

6. The method of claim 5, further comprising:
determining to accept the initial FTM request; and
limiting, based on the FTM response preference score, a number of exchanges with the ISTA responsive to the initial FTM request.

7. An access point (AP) comprising:
one or more computer processors configured to:
receive an initial Fine Timing Measurement (FTM) request from an Initiating Station (ISTA);
determine, based on the FTM request, whether the ISTA will share location results of the FTM request with the AP;
calculate a utilization of the channel;
determine a priority classification of the ISTA relative to other ISTAs based at least in part on whether the ISTA will share the location results of the FTM request with the AP and the utilization of the channel; and
determine, based at least partly on the priority classification, whether to accept the initial FTM request.

8. The AP of claim 7, wherein determining the priority classification of the ISTA comprises:
generating a FTM response sensitivity score for the ISTA using a plurality of factors,
wherein the priority classification is based on the FTM response sensitivity score relative to FTM response sensitivity score of the other ISTAs.

9. The AP of claim 8, wherein the AP operates as a Responding Station (RSTA), wherein the plurality of factors include whether the ISTA will share the location results of the FTM request with the AP, the utilization of the channel, and one or more factors selected from the following:
whether the ISTA is associated with the RSTA;
a ranging measurement mode of the ISTA;
a ranging priority parameter of the ISTA;
an authentication group type of the ISTA;
a level of traffic of the ISTA;
a type of the traffic of the ISTA; and
a rate of movement of the ISTA.

10. The AP of claim 7, wherein the one or more computer processors are further configured to:
monitor FTM exchanges of the ISTA during a predefined period,
wherein determining whether to accept the initial FTM request is further based on the monitored FTM exchanges.

11. The AP of claim 10, wherein the one or more computer processors are further configured to:
generate a FTM response preference score for the ISTA using the channel utilization, the monitored FTM exchanges, and the priority classification,
wherein determining whether to accept the initial FTM request is based on the FTM response preference score.

12. The AP of claim 11, wherein the one or more computer processors are further configured to:
determine to accept the initial FTM request; and
limiting, based on the FTM response preference score, a number of exchanges with the ISTA responsive to the initial FTM request.

13. A computer program product comprising:
a non-transitory computer-readable storage medium having computer-readable program code embodied therewith, the computer-readable program code executable by one or more computer processors to perform an operation comprising:
receiving, at a Responding Station (RSTA) over a channel, an initial Fine Timing Measurement (FTM) request from an Initiating Station (ISTA);
determining, based on the FTM request, whether the ISTA will share location results of the FTM request with the RSTA;
calculating a utilization of the channel;
determining a priority classification of the ISTA relative to other ISTAs based at least in part on whether the ISTA will share the location results of the FTM request with the RSTA and the utilization of the channel; and
determining, based at least partly on the priority classification, whether to accept the initial FTM request.

14. The computer program product of claim 13, wherein determining the priority classification of the ISTA comprises:
generating a FTM response sensitivity score for the ISTA using a plurality of factors,
wherein the priority classification is based on the FTM response sensitivity score relative to FTM response sensitivity score of the other ISTAs.

15. The computer program product of claim 14, wherein the plurality of factors include whether the ISTA will share the location results of the FTM request with the RSTA, the utilization of the channel, and one or more factors selected from the following:
whether the ISTA is associated with the RSTA;
a ranging measurement mode of the ISTA;
a ranging priority parameter of the ISTA;
an authentication group type of the ISTA;
a level of traffic of the ISTA;
a type of the traffic of the ISTA; and
a rate of movement of the ISTA.

16. The computer program product of claim 13, the operation further comprising:
monitoring FTM exchanges of the ISTA during a predefined period,
wherein determining whether to accept the initial FTM request is further based on the monitored FTM exchanges.

17. The computer program product of claim 16, the operation further comprising:
generating a FTM response preference score for the ISTA using the channel utilization, the monitored FTM exchanges, and the priority classification,
wherein determining whether to accept the initial FTM request is based on the FTM response preference score.

* * * * *